June 1, 1954        P. FLAMM        2,679,753
MEANS FOR MEASURING ENGINE PERFORMANCES
Filed Aug. 24, 1949
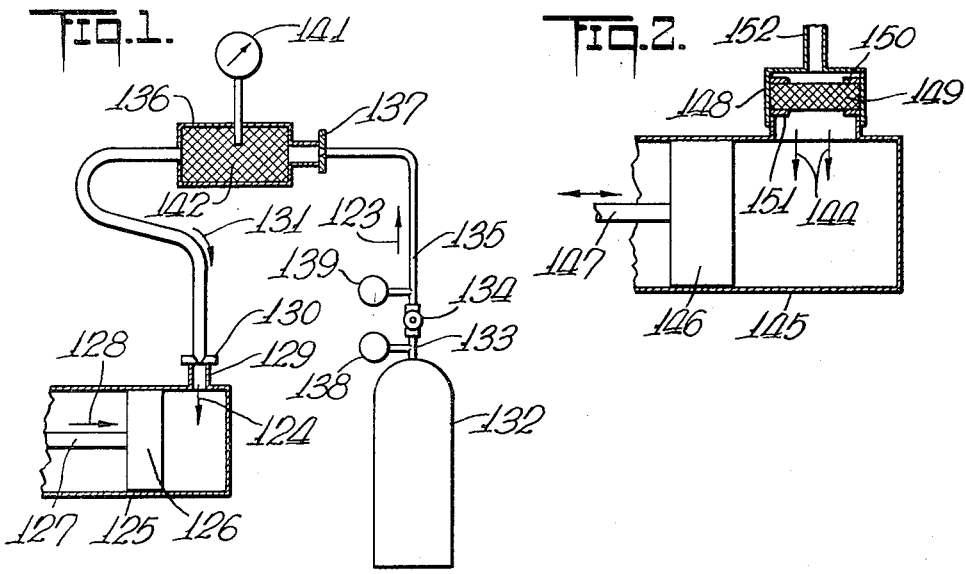
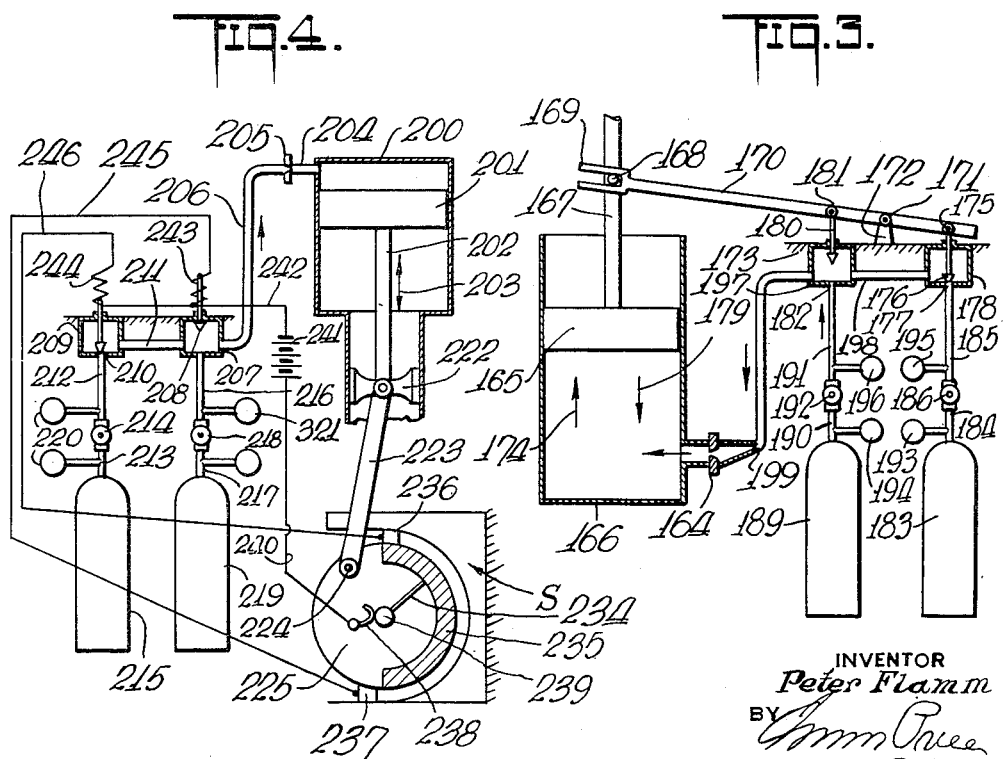
INVENTOR
*Peter Flamm*
BY
ATTORNEY Patented June 1, 1954

2,679,753

UNITED STATES PATENT OFFICE 2,679,753

MEANS FOR MEASURING ENGINE PERFORMANCES

Peter Flamm, Kiel, Germany, assignor to Arno Thun, New York, N. Y.

Application August 24, 1949, Serial No. 112,005

10 Claims. (Cl. 73—115)

The present invention relates to a means for measuring engine performances and it particularly relates to means for measuring reciprocating engine performances.

In connection with reciprocating engines, particularly of the piston type, the usual engine indicator and resulting engine diagram is of value in laboratory testing, but has not proved to be of practical importance in the commercial field where the engine is actually operating to carry a load, either as a stationary engine or as a locomotive or vehicle engine.

It is not possible to secure rapidly and quickly, without involved calculations, the various figures which would be needed to determine reciprocating engine performance in commercial installations or locomotive or vehicle engines of various types.

It is among the objects of the present invention to provide a simple, practical and commercial procedure for determining reciprocating engine performance which will permit the operator of a stationary or moving reciprocating engine installation to readily determine the performance of such engine and particularly which will enable him to quickly determine the value of mean indicating piston or cylinder pressure.

The usual indicator is a delicate instrument and cannot be subjected to long usage as it would encounter in commercial practice for use upon stationary or reciprocating engines. The accuracy of such instruments is not only influenced by vibration but by its own mass and as a result the diagrams or graphs produced thereby will not accurately give the correct reading of engine performance. These difficulties are multiplied with high-speed motors.

It is therefore among the further objects of the invention to provide a novel indicating means for determining engine performance which will enable a rapid evaluation of power, fuel consumed, and efficiency of personnel and which will also give a ready indication of road, weather, friction and other difficulties and which can be used directly upon commercial operating engines whether stationary or motor.

A further object is to provide an engine indicating means which will not be readily subject to inaccuracy due to vibration, lack of care and maintenance and which will directly give indication of the average mean pressure, from which it is possible to judge engine performance with an unknown load as well as the characteristics of the engine installation and the quantity of the consumed fuel.

A further object is to provide a novel, reciprocating engine indicator which will be altogether devoid of wear of mechanical parts, such as pistons, springs, gears, flywheels and so forth, and which will not be readily subject to damage or derangement and which will function effectively either at low speeds or at high speeds exceeding 700 to 800 R. P. M.

With the standard engine indicators, it is necessary to employ a planimeter, particularly in laboratory installations, where it is desirable to determine the power output or mean average pressure of the installation and it is among the further objects of the present invention to provide an installation which will give direct results without the necessity of using a planimeter.

In accomplishing the above objects, it has been found most satisfactory to provide a performance indicating system and procedure which will depend upon maintaining a pressure in desired proportion or ratio to the pressure in the engine cylinder.

In accomplishing this, it is desirable to avoid auxiliary pistons or diaphragms which may become clogged by dirt, dust and carbon arising within a reciprocating piston cylinder and it is also desirable to avoid fine orifices which may become clogged with such dirt, dust or carbon, as the case may be.

It is therefore among the further objects of the present invention to provide a novel engine performance indicating arrangement which will accurately, effectively and practically indicate the operating characteristics of a reciprocating engine without the need for removing gases from the cylinder and without liability of clogging external orifices or affecting the accuracy of diaphragms and pistons from the dust and dirt in the cylinder.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a source of gas or fluid pressure, and preferably air pressure substantially higher than the maximum pressure in the engine cylinder.

This pressure will be balanced through suitable flow arrangements and orifices against the cylinder pressure with intervening ceramic plugs or filter means, with the result that an intermediate pocket or chamber will be formed in which the pressure may be measured. From these measurements, it is possible to readily calculate engine performance.

If desired, a plurality of chambers may be employed, one connected to receive the fluid or air under pressure when the engine is in a compression stroke and the other being arranged to receive it when the engine is in an expansion stroke.

The valving arrangement may be operated either by mechanical connections to the reciprocating engine or by suitable electrical control arrangements.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side diagrammatic view showing one form of the present invention with a compressed air source connected to an engine cylinder through an intermediate chamber.

Fig. 2 is a plan view of a modification as applied to Fig. 1.

Fig. 3 is a side diagrammatic view of an alternative arrangement.

Fig. 4 is a side diagrammatic view of another alternative arrangement.

In Fig. 1 is shown a preferred embodiment of the present invention, in which there is provided an engine cylinder 125 with a piston 126 having a connecting rod 127 which reciprocates as indicated at 128.

Into the cylinder 125, by the conduit 129 and the orifice 130, the air flows under pressure as indicated by arrow 124. This gas is preferably an inert gas such as nitrogen or preferably air which may be held under high pressure in the bottle or flask 132.

Preferably, the bottle 132 contains compressed air and this compressed air passes by the pipes 133, the control valve 134 and the pipe 135, past the orifice 137, into the chamber 136. The valve 134 acts as a pressure or flow regulator and the pressure on opposite sides of the pressure regulator is indicated by the gages or meters 138 and 139.

The pressure registered on the gage 139 should at all times be higher than the maximum pressure within the cylinder 125. The amount or flow of the compressed air which will pass from the pressure bottle 132 into the cylinder 125 depends upon the speed of reciprocation of the piston 126 as well as the pressure in the cylinder 125. The orifices 130 and 137 will regulate the flow of air as indicated by the arrows 123, 131 and 124.

The intermediate chamber 136 may be filled with absorbent material or a filtering material, which will let the air pass but prevent passage of dirt and dust likely to clog.

The porous material indicated at 142 should be of a nature which will not clog or change in flow restricting effect either because of foreign bodies of material carried in the stream or because of chemical reaction therewith.

The pressure registered on a time basis in gage 141 in the receptacle 136 will be equivalent to the mean pressure. The amount of air withdrawn from the bottle 132 will be proportional to the pressures in the engine cylinders 125.

The gage 141 will therefore indicate the performance.

The difference of pressure in flask 132 at the beginning and end of the measured operation will give the amount of the measuring medium used. This used quantity is an indication of the mean pressure on a time basis.

In the device of Fig. 2 is shown a cylinder 145 receiving the piston 146 and the connecting rod 147. In the chamber 148 is provided a porous cartridge 149 which may be of a ceramic material which is held in position by the plates 150 and 151. The porous plate 149 will prevent passage of dirt, dust, carbon or other foreign particles from the cylinder 145 and the conduit 152, and act as the restriction 130 of Fig. 1. The pipe 152 may lead to an arrangement such as shown in Fig. 1.

The material 149 may be partly closed off by a lacquer or varnish so as to regulate the amount of gas or fluid which may pass from the cylinder 145 to the conduit 152.

In the arrangement of Fig. 3, the piston 165 reciprocating in the cylinder 166 has a connecting rod 167. The connecting rod has a pin 168 fitting in the clevis 169 on the arm 170, which is pivotally mounted at 171 on the bracket 172. The bracket 172 is mounted upon the frame or floor 173.

During the movement of the piston 165 in the direction 174, the rod 170, through the pivotal connection 175 and the valve 176, will close the opening 177 in the chamber 178. On reverse movement, as indicated by the arrow 179, the rod 170 will press down the valve 180 connected to it by the pivot 181 to close off the opening 182 in the chamber 197.

The chambers 197 and 178 are connected by pipe 198. The chamber 197 is connected by pipe 199 and orifice 164 to cylinder 166.

The openings of the valves 176 and 180 are so synchronized to the crank shaft of the engine that valve 180 is only open during the time of compression and valve 176 is only open during the expansion or work period of the piston 165.

As a result, the compressed air will flow from the bottle 183 through the conduits 184 and 185, past the regulating valve 186, into the chamber 178 only during a work period or expansion period.

On the other hand, the flow from the bottle 189 through the conduits 190 and 191, past the regulating valve 192 will take place only during the compression period or when it is necessary to do work on the engine.

The gauges 193 and 194 will measure the pressure in the bottles 183 and 189, respectively, while the gauges 195 and 196 will measure the pressures past the regulating valves 186 and 192, respectively.

Then, to obtain the average value, it is only necessary, after the measuring period, to deduct the quantity of compressed air left in flask 189 from that left in the flask 183, and this will give the amount of compressed air which has been used and enable a ready calculation of the value of mean pressure.

The opening and closing of the valves 180 and 176 should take place exactly at the dead point of the piston at each end of its stroke.

Instead of the mechanical arrangement shown in Fig. 10, it is also possible to open and close these valves through electrical arrangements such as is shown in Fig. 4.

In the arrangement of Fig. 4, the cylinder 200 has a piston 201 and a connecting rod 202 reciprocating as indicated at 203. To the end of the cylinder is connected a conduit or pipe 204 having an orifice 205.

The conduit 204 connects with the pipe 206 which leads to the chamber 207 having the valve 208 and chamber 209 having the valve 210 with a connecting pipe 211. The chamber 209 communicates by the tubes 212 and 213 and the regulating valve 214 with a compressed air bottle 215. The chamber 207 communicates by the tubes 216 and 217 and the regulating valve 218 with the compressed air bottle 219.

The gauges 220 and 221 are placed on opposite sides of the regulating valves 214 and 218. The connecting rod is provided with a slide or cross head member 222 and a crank rod 223 connecting at 224 to the rotating member 225.

In the arrangement shown in Fig. 4 the opening and closing of the valves 208 and 210 respond to engine operation through the engine switch arrangement S.

The rotating member 225 is provided with a contact half cylinder 235 having the contact blocks 236 and 237 and also the contact fingers 238, which rides upon a central contact shaft 239. The shaft 239 is connected to the segment 235 by the rod 234.

The electrical circuits then extend, as indicated by the wire 240, from the contact finger 238 past the battery 241, the wire 242, to the solenoid coils 243 and 244 which are effective to raise or lower the valves 208 and 210. From the other side of the coils 243 and 244 the circuits lead, as indicated at 245 and 246, to the contact blocks 236 and 237.

In the system of Figs. 1 to 4 the clean air is injected without clogging of orifices 130, 137, 149, 165 and 205 into the engine cylinder 125, 145, 200 and 166. In Fig. 1 a pressure in receptacle 136 equals the means pressure on a time basis. The orifices 130, 137, 149, 164 and 205 assure that the amount of air withdrawn from cylinders 132, 133, 189, 215 and 219 will be proportional to the pressure in the engine cylinders 125, 145, 166 and 200.

In calculating the engine performance from the readings above obtained the average mean pressure is determined for each run or over each interval to be measured from the pressure loss in the compressed air flasks upon a time basis or by the recording of the fluid flow into the engine cylinder.

The sum of the various mean pressures multiplied by the time elapsed for each of said mean pressures divided by the total time will give the overall average mean pressure.

It is altogether unnecessary to obtain an engine diagram by an engine indicator, then determine its area by a planimeter and determine the average pressure by division of said area.

The arrangement for feeding air or other fluid under pressure into the cylinder from only one pressure source during the expansion stroke and from another pressure source during the compression stroke is only shown diagrammatically above. Suitable snap action valving or eletro-magnet arrangements will be provided to closely synchronize these operations with the valves.

Or a valve may be used with one side open and the other side closed and alternating the open side with closed side.

In all cases both valves are synchronized to the crankshaft of the engine that one valve is only open during the time of compression and the other valve is only open during the work period or expansion period of the cylinder.

As a result the measuring medium from one pressure source will flow into the engine cylinder only during the compression period, and the measuring medium from the other source will flow into the cylinder only during the expansion or work period.

Thus to obtain the average value all that is necessary after the measuring period is to deduct the quantities of the measuring medium which have been measured from each other.

It is important that the opening and closing of the valves takes place exactly at the dead end moment of the piston at each end.

The system at all times must be accurately synchronized with the engine cycle. Where it is impractical to employ high pressure air flasks as a source for the measuring medium a fluid or air pressure pump may be used.

The pump may be directly coupled to the crankshaft of the engine or independently operated. Where the pump is driven by the engine the pressure of the measuring medium will rise with the increase in the R. P. M. or fall with the decrease of the R. P. M. of the engine. Nevertheless the consumed amount of the measuring medium will remain constant if the pressure in the engine cylinder remains unchanged since the time cycle is shortened or lengthened with the increase or decrease of the R. P. M. of the engine and thus is proportionately regulated.

Whatever is lost on flow time is equalled through the increased pressure as long as the mean pressure in the engine cylinder remains unchanged.

As soon as variations of the mean pressure occur, the amount of the measuring medium or compressed air is changed proportionately to the pump pressure and also relative to the mean pressure in the engine cylinder.

The amount of the measuring medium or compressed air used may at all times be determined through flow, volume or pressure meters giving momentary or continuous recordings. The meters may also give all the values automatically instead of only indicating the momentary value at any given moment.

This measurement of the measuring medium or compressed air will not be influenced through the speed of the engine. Through this arrangement the mean pressure is obtained and added up on a distance basis, which is identical with the result obtained from the planimetered indicator. The working elements of the mechanical indicator will thus have been eliminated.

The gas or fluid which is introduced into the cylinders 125, 145, 166 and 200 from the compressed fluid containers 132, 183, 189, 215 and 219 is restricted to such small quantities by the orifices 130, 142, 149, 164 and 205 as not to interfere with the operation of the internal combustion engine or the air or steam engine, as the case may be. The flow into the cylinders 125, 145, 166 and 200 will be slower at the end of the compression stroke than at the end of the expansion stroke but the average flow into the cylinder will nevertheless be metered or measured by the gauges 141, 193 to 196, 220 and 321. The amount of flow into the working engine cylinder is not sufficient to affect the operation of the device, but is restricted to an extremely low value.

As many changes could be made in the above methods and means for measuring engine performances, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance.

2. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, said means including a flow meter to measure the flow of said fluid into said cylinder.

3. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, said conduit being provided with restrictions to the flow of the fluid.

4. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, said conduit being provided with restrictions to the flow of the fluid consisting of orifices.

5. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, said conduit being provided with restrictions to the flow of the fluid consisting of ceramic plugs.

6. A reciprocating engine performance measuring device comprising a conduit leading to the cylinder of the engine and a source of fluid pressure higher than the maximum pressure in the cylinder to cause said fluid to flow at a varying rate into the cylinder, gage means connected to said conduit for measuring the flow of said fluid, said gage means giving a measurement which is indicative of engine performance, said source of fluid pressure including a single compressed air container.

7. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, said source of fluid pressure including two alternately connected compressed air containers, and connection means connecting one container to said conduit during the engine stroke in one direction and connecting the other container to said conduit during the engine stroke in the reverse direction.

8. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, said source of fluid pressure including two alternately connected compressed air containers and connection means to alternately connect one container during the compression stroke and the other container during the expansion stroke, said connection means connecting one container to said conduit during the engine stroke in one direction and connecting the other container to said conduit during the engine stroke in the reverse direction.

9. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance, and said source including a double container having fluid under pressure and mechanically actuated valve means to connect to the engine cylinder one container during each compression stroke and the other container during each expansion stroke, said connection means connecting one container to said conduit during the engine stroke in one direction and connecting the other container to said conduit during the engine stroke in the reverse direction.

10. A reciprocating engine performance measuring device comprising a conduit leading to the cylinder of the engine and a source of fluid pressure higher than the maximum pressure in the cylinder to cause said fluid to flow at a varying rate into the cylinder and gage means connected to said conduit for measuring the flow of said fluid, said gage means giving a measurement which is indicative of engine performance and said source including a double container having fluid under pressure and electrically actuated valve means to connect to the engine cylinder one container during each compression stroke and the other container during each expansion stroke, said connection means connecting one container to said conduit during the engine stroke in one direction and connecting the other container to said conduit during the engine stroke in the reverse direction.

References Cited in the file of this patent

UNITED STATES PATENTS

| Number | Name | Date |
| --- | --- | --- |
| 1,960,158 | Lehmann | May 22, 1934 |
| 2,212,466 | Bradford | Aug. 20, 1940 |